Nov. 3, 1931.   J. S. MADDERRA   1,830,283
SEED PLANTING DEVICE OR THE LIKE
Filed Nov. 23, 1929
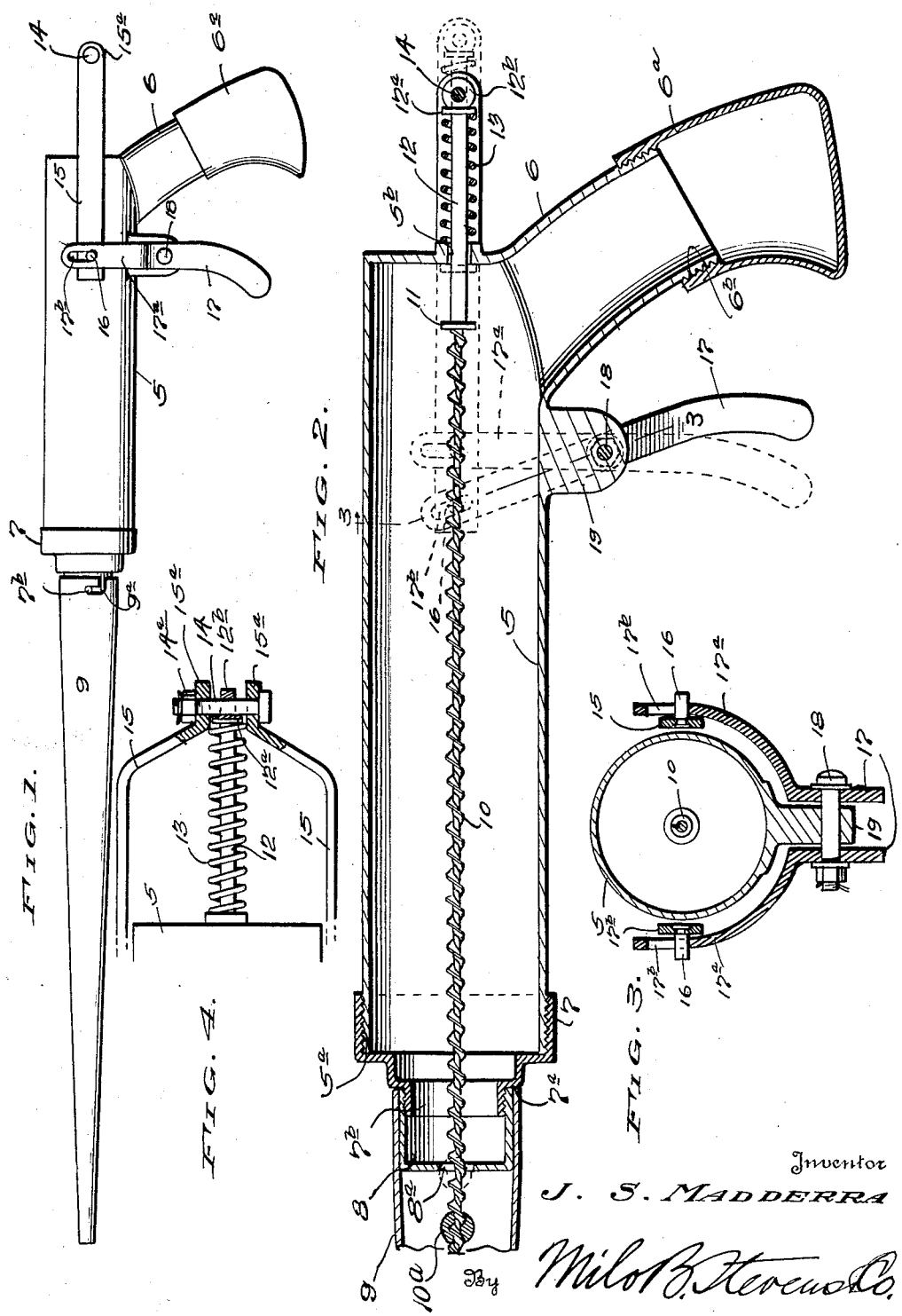

Patented Nov. 3, 1931

1,830,283

UNITED STATES PATENT OFFICE

JAMES S. MADDERRA, OF BUTLER, OKLAHOMA

SEED PLANTING DEVICE OR THE LIKE

Application filed November 23, 1929. Serial No. 409,394.

My invention relates to improvements in seed planters and the like, although capable of other applications.

Briefly stated, one of the primary objects of the invention is to provide a novel and improved device of the character set forth which comprehends novel means for positively effecting the deposit of seed in the ground at a predetermined depth.

Another object of the invention is to furnish a device of the kind stated, which is very simple in construction comprising a minimum number of durable easily manufactured parts,—so arranged and combined as to make the device simple and positive in operation and convenient to use.

A still further object of the invention is to provide a novel feeding means which normally is disposed to prevent discharge of the seed or other contents.

The invention furthermore contemplates a device for the purpose specified which is adapted to be used for planting seeds of different sizes.

The invention also resides in certain novel features of construction, combination and arrangement of the various parts and in modes of operation, all of which will be readily appreciated and understood by those skilled in the art upon reference to the accompanying drawings in connection with the following detailed description.

While the drawings illustrate what is now regarded as a preferred mechanical expression of the invention,—yet it is to be understood that the same is capable of considerable change and modification within the spirit and scope of the subject matter claimed hereinafter,—it being particularly evident that the invention is applicable to power operated planting devices as well as manually operated planting devices.

In the drawings, wherein the same reference characters have been used to designate the same parts throughout, Figure 1 is a side elevational view illustrating a planting device constructed in accordance with my invention;

Figure 2 is an enlarged longitudinal sectional view through the device, a portion of the discharge nozzle or barrel having been broken away;

Figure 3 is a cross sectional view taken on the line 3—3 of Figure 2, and

Figure 4 is a top plan view taken at the rear of the chamber or barrel to show the operating means for the seed seeder.

Referring specifically to the drawings by reference characters, numeral 5 denotes a cylindrical chamber having an inlet neck 6 at one end assimulating the handle of a pistol,—this neck having a closure $6^a$ threaded thereon, as indicated at $6^b$, the closure completing the pistol-like handle of the container 5.

The discharge end of the chamber 5 is threaded, as at $5^a$, to receive the threaded collar 7 which has the forwardly extending reduction $7^b$ providing the shoulder $7^a$ against which the end of a cup-like member is adapted to abut. The cup-like member 8 is threaded upon the reduction $7^b$ of the member 7 and has a central outlet opening $8^a$, as shown. The seed within the container is adapted to be discharged through the outlet opening $8^a$ into the elongated fustro-conical discharge nipple 9 which is adapted to fit over the cup-like member 8. To secure the members 8 and 9 together, the latter may have a bayonet slot $9^a$ to receive a pin $7^c$ of the cup-like member 8. The fustro-conical element 9 is adapted to be inserted into the ground so that the seeds can be planted well below the surface. It is understood that a number of members 8 will be provided and adapted to be used according to the size of the seed in a particular instance.

Within the cylindrical member 5 is the spiral conveyor or agitator member 10 extending the full length of the chamber and projecting out through the hole $8^a$,—it being observed that the end of this agitator or rather at a point adjacent the end, there is provided a rubber sphere 10ª which in the normal position of the conveyor 10 is adapted to seal the seed discharge opening 8ª of the cup-member 8. Naturally, movement of agitator element 10 in the direction of the discharge funnel 9 causes such element to rotate by reason of the helical exterior formation thereof. This agitates the seed and positively conveys same in the direction of the discharge end of the funnel member 9.

At the rear end of the chamber 5 is a bearing 5ᵇ through which the rounded shank portion 12 of the conveyor or agitator 10 extends,—it being noted that the portions 10 and 12 of the conveyor are separated by a disk-like flange 11, which serves to limit rearward movement of the agitator 10.

The rear end of the portion 12 of the agitator 10 terminates in an eye 12ᵇ, as shown, and which is adapted to receive a bolt or pin 14 which is best shown in Figure 4. A coil spring 13, arranged about the portion 12 of the agitator and bearing against the bearing 5ᵇ and a disk 12ª on such portion 12, normally urges the agitator rearwardly so as to engage the stop 11 against the inner face of the bearing 5ᵇ about the agitator portion 12.

Referring particularly to Figure 4 it will be noted that a pair of link members 15 have off-set apertured ends 15ª receiving the end portions of the bolt or pivot pin 14 which passes through the eye 12ᵇ, as aforesaid. A nut 14ª on the end of the bolt 14 holds the parts assembled.

The links 15 extend forwardly alongside the barrel or chamber 5 at opposite sides and adjacent their forward ends each link 15 is provided with a laterally projecting pin 16, as best shown in Figure 3. The pins 16 engage in elongated slots 17ᵇ of the arms 17ª of a trigger member 17, which is pivoted as at 18 to a lateral lug 19 projecting from the barrel just forwardly of the handle 6.

Figure 2 shows very clearly that upon retraction of the trigger 17, as in the firing of a pistol, the agitator 10 will be forced forwardly,—which is to say in the direction of the discharge funnel 9, thus moving the stopper or spherical plug 10ª out of the discharge opening 8ª and permitting the passage of seed therethrough and into the funnel.

It is believed to be perfectly plain that a quick pull and release of the trigger 17 will effect a sparing planting of seeds, inasmuch as the stopper elements or sphere 10ª will quickly reseat itself to close opening 8ª. However, a slow pull and gradual release of the trigger 17 will effect the planting of a much larger quantity of seed.

The funnel-like extension 9 may be of any desired length and its size may be varied according to the seeds to be planted, it being manifest that barrels or funnels may be readily changed.

The device is very simple and enables seeds to be readily planted by hand without bringing the hand into contact with the ground.

Figure 2 clearly shows that the rear end of the frusto-conical or funnel-like tube 9 abuts against the shoulder 7ª of the member 7 which serves as a stop therefore. Of course, the handle element 6 serves as a filling neck.

Having thus described my invention, what I claim as new and desire to secure by Letters Patent is:

1. A device of the class described comprising a barrel-like body having a handle-like neck adjacent one end providing a hand grip, said neck being hollow to serve as a material inlet, a closure for said neck and completing the handle, the opposite end of said barrel being tapped, a collar adapted to be threaded upon the last mentioned end of said barrel and having a forwardly extended reduction providing a shoulder, a cup-like member threaded upon said reduction and having a central outlet opening, an agitator element extending through said barrel and projecting from both ends, said agitator element extending through said cup-opening, a sealing plug carried by said agitator element beyond said cup-opening and adapted to seal same, a stop adjacent the rear end of said agitator element and adapted to abut the end wall of said barrel, spring means acting upon said agitator element beyond the rear end of said barrel for normally moving said element in a direction to bring said plug to outlet opening sealing position, said barrel having a lug portion forwardly of said handle, a trigger pivoted on said lug portion and having arms extending upwardly along opposite sides of said barrel, links pivoted to said arms and extending rearwardly beyond the end of said barrel, and an actuating connection between said links and the rear end of said agitator whereby the same under the influence of said trigger may be caused to move to unseat the plug from said cup-opening.

2. A seed planter comprising a chambered body having a bearing at one end and a discharge opening at the opposite end, a combined agitator and ejector extending through said bearing and discharge opening, a closure for said opening and carried by said combined agitator and ejector, a trigger pivoted to said body exteriorly thereof, and a yoke connection between said trigger and said agitator ejector outwardly of said bearing.

3. The combination set forth in claim 2, and including spring means interposed between the bight portion of said yoke and said bearing about said ejector for actuating the same to maintain said closure in the closed position.

4. A seed planter comprising a chambered body having a bearing at one end and a discharge opening at the opposite end, a combined agitator and ejector extending through said bearing and discharge opening, a closure for said opening and carried by said combined agitator and ejector, a trigger pivoted to said body exteriorly thereof, a yoke connection between said trigger and said agitator ejector outwardly of said bearing, and said body having a nipple at its discharge end, and means on said nipple for retaining a discharge extension in seated position upon said nipple.

In testimony whereof I affix my signature.

JAMES S. MADDERRA.